(12) United States Patent
Cookson et al.

(10) Patent No.: US 8,264,935 B2
(45) Date of Patent: Sep. 11, 2012

(54) METHOD AND APPARATUS FOR READING OPTICAL DISCS HAVING DIFFERENT CONFIGURATIONS

(75) Inventors: Christopher J. Cookson, Studio City, CA (US); Lewis S. Ostrover, Los Angeles, CA (US)

(73) Assignee: Warner Bros.Home Entertainment Inc., Burbank, CA (US)

( * ) Notice: Subject to any disclaimer, the term of this patent is extended or adjusted under 35 U.S.C. 154(b) by 926 days.

(21) Appl. No.: 12/345,748

(22) Filed: Dec. 30, 2008

(65) Prior Publication Data

US 2009/0147663 A1 Jun. 11, 2009

Related U.S. Application Data

(62) Division of application No. 10/719,308, filed on Nov. 20, 2003, now Pat. No. 7,512,048.

(51) Int. Cl.
*G11B 7/20* (2011.01)
*G11B 7/0045* (2006.01)

(52) U.S. Cl. ............... 369/95; 369/47.16; 369/59.14; 369/59.24

(58) Field of Classification Search ............ 369/47.15, 369/47.16, 47.2–47.24, 47.28, 47.29, 47.36, 369/47.38–47.41, 47.45, 47.46, 53.31–53.35, 369/59.23, 59.25–59.27, 94, 95, 275.1–275.4; 720/600, 601, 658, 659, 668–670
See application file for complete search history.

(56) References Cited

U.S. PATENT DOCUMENTS

| | | | | | |
|---|---|---|---|---|---|
| 4,843,484 | A | * | 6/1989 | Kanamaru et al. | 386/241 |
| 4,905,215 | A | * | 2/1990 | Hattori et al. | 369/14 |
| 5,442,455 | A | * | 8/1995 | Hioki et al. | 386/336 |
| 5,563,855 | A | * | 10/1996 | Nakase et al. | 386/335 |
| 5,995,457 | A | * | 11/1999 | Jamail | 369/30.04 |

FOREIGN PATENT DOCUMENTS

JP 11260042 A * 9/1999

OTHER PUBLICATIONS

Machine-Assisted Translation of JP 11260042 A.*

* cited by examiner

*Primary Examiner* — Nathan Danielsen
(74) *Attorney, Agent, or Firm* — Gottlieb, Rackman & Reisman, P.C.

(57) ABSTRACT

A player is provided that is capable of playing discs of either a first or a second configuration. Both types of discs can be double-sided optical discs formed with data tracks. In one configuration, the tracks on one side follow one spiral while the tracks on the other side follow a second spiral, the two spirals being oriented in opposite directions as viewed from the respective sides, and therefore being mirror images of each other. This allows data to be read by a player seamlessly from both sides of the disc without changing the direction of rotation of the disc. In the other configuration, the tracks follow identical spirals. The disc is then rotated in one direction for one side and the other direction for the other side.

10 Claims, 13 Drawing Sheets

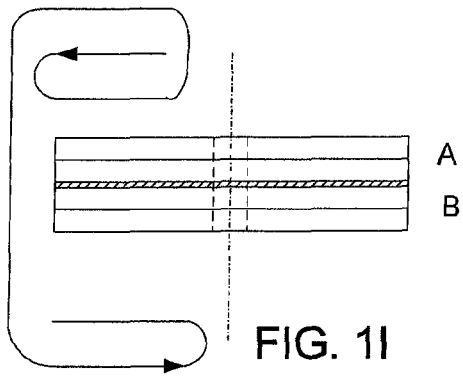
FIG. 1I
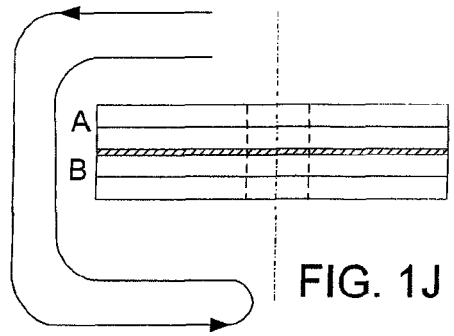
FIG. 1J
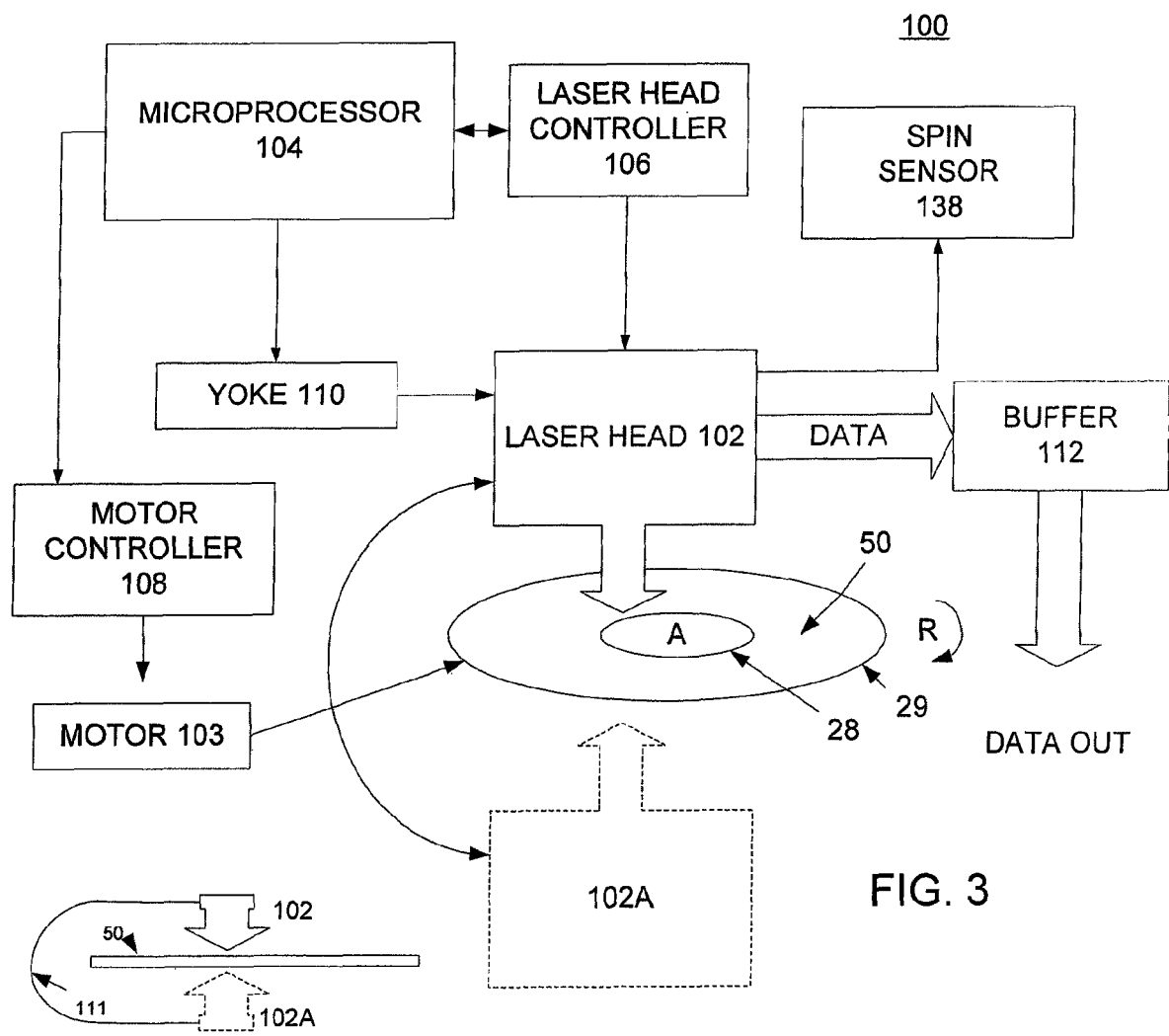
FIG. 3
FIG. 3A

| A | S1 | S2 | S3 | S4 |
|---|---|---|---|---|
| B | A1 | A2 | A3 | A4 |

| B1 | B2 | B3 | B4 |
|---|---|---|---|

FIG. 7

| | S1 | S2 | S3 | S4 |
|---|---|---|---|---|
| A | A1 | A2 | A3 | A4 |

| | | | | | | | | |
|---|---|---|---|---|---|---|---|---|
| B | B1 | E | B2 | E | B3 | E | B4 | E |

FIG. 8

| | S1 | S2 | S3 | S4 |
|---|---|---|---|---|
| A | A1 | A2 | A3 | A4 |

| B | K1 \| L1 \| M1 \| N1 | K2 \| L2 \| M2 \| N2 | K3 \| L3 \| M3 \| N3 | K4 \| L4 \| M4 \| N4 |
|---|---|---|---|---|
| | B1 | B2 | B3 | B4 |

FIG. 9

| | S1 | S2 | S3 | S4 |
|---|---|---|---|---|
| A | D1 | D3 | D5 | D7 |
| B | D2 | D4 | D6 | D8 |

FIG. 10

METHOD AND APPARATUS FOR READING OPTICAL DISCS HAVING DIFFERENT CONFIGURATIONS

This application is a Division of U.S. Ser. No. 10/719,308 filed Nov. 20, 2003 now U.S. Pat. No. 7,512,048, the content of which is incorporated herein by reference.

RELATED APPLICATIONS

The subject matter of this application is related to the inventions disclosed in the following applications:
U.S. Ser. No. 10/716,240, entitled "A PLAYER WITH A READ-HEAD YOKE FOR DOUBLE-SIDED OPTICAL DISCS", now abandoned;
U.S. Ser. No. 10/716,109, entitled "A PLAYER WITH TWO READ HEADS FOR DOUBLE-SIDED OPTICAL DISCS", issued on Dec. 19, 2006, U.S. Pat. No. 7,151,734;
U.S. Ser. No. 10/717,808, entitled "OPTICAL DISC WRITER FOR MAKING DOUBLE-SIDED OPTICAL DISCS", now abandoned;
U.S. Ser. No. 10/718,084, entitled "A DOUBLE-SIDED OPTICAL DISC WITH MEANS FOR INDICATING ITS PROPER DIRECTION OF ROTATION", now abandoned;
U.S. Ser. No. 10/717,809, entitled "A DISC DRIVE OR PLAYER FOR READING DOUBLE-SIDED OPTICAL DISCS", now abandoned;
U.S. Ser. No. 10/716,113, entitled "AN IMPROVED DOUBLE-SIDED OPTICAL DISC", now abandoned;
U.S. Ser. No. 10/717,063, entitled "A METHOD AND SYSTEM OF MASS PRODUCING DOUBLE-SIDED OPTICAL DISCS", issued on Apr. 22, 2008, U.S. Pat. No. 7,362,692;
U.S. Ser. No. 10/717,061, entitled "AN OPTICAL DISC PLAYER HAVING A READ HEAD WITH DUAL LASER BEAM SOURCES", now abandoned;
U.S. Ser. No. 10/718,882, entitled "A METHOD OF READING DATA FROM THE SIDES OF A DOUBLE-SIDED OPTICAL DISC", now abandoned;
U.S. Ser. No. 10/719,045, entitled "A METHOD OF READING DATA FROM A DOUBLE SIDED MULTI-LAYERED OPTICAL DISC", now abandoned;
U.S. Ser. No. 10/719,226, entitled "A METHOD AND APPARATUS FOR READING DATA FROM AN OPTICAL DISC IN A REVERSE DIRECTION", now abandoned;
U.S. Ser. No. 10/717,704, entitled "A PLAYER WITH ROTATIONAL CONTROL FOR DOUBLE-SIDED OPTICAL DISCS", issued on Feb. 5, 2008, U.S. Pat. No. 7,327,648.

BACKGROUND OF THE INVENTION

1. Field of Invention

This invention pertains to a method of playing optical discs having one of at least two configurations. More particularly, the application pertains to a method and apparatus in which once an optical disc is inserted, the player can play both sides with the disc being rotated in a predetermined direction, or the player can the two sides sequentially with the disc being rotated in one direction for one side and in the opposite direction for the other. The choice on the mode of operation can be made by a user, or can be made automatically, based on analyzing the data on the sides of the disc.

2. Description of the Prior Art

A double-sided multiple-layer optical disc, such as a DVD, has a very large digital data storage capacity. For example, a DVD-18 having two data layers on each side can be used to store about 18 GB of data. Therefore, double-sided DVDs are becoming a favorite medium for recording and distributing multimedia programming, such as movies. A double-sided optical disc can store the visual portion of the programming, the audio portion in one or more languages, and various additional information that may be related to the programming.

Typically, DVDs are read by players that are capable of reading only one side at a time. A DVD is first inserted into the player with its first side oriented toward the read head. The player detects that the DVD is present and directs its read head to read data from one of the layers (typically, the outer layer) while the DVD is rotated in a preselected direction. When the player is finished reading data from the first side (one or both layers), the user removes the DVD, flips it upside down and reinserts it with the second side facing the read head. The player then directs its head to read the data from one or both layers of the second side.

One major problem with this whole process is that data cannot be read from both sides of the DVD seamlessly since the DVD must be physically removed from the player and flipped around. A further disadvantage is that data cannot be read from the two sides simultaneously.

An optical disc known as the Laserdisc (LD) has also been used for distributing and playing multimedia presentations. However, a Laserdisc has several disadvantages as a result of which few if any LDs are made. First, an LD is fairly large, having a diameter of about 12 in, i.e., in the same range as an LP record. Second, the LD has only a single data layer on each side, and therefore its capacity of storing information is small. Third, just like on existing DVDs, data on the two sides of an LD are disposed along respective spirals, with the spiral on one side being identical to the spiral on the other. As a result, once an LD has been inserted into a standard player to play one of its sides, it must usually be removed and flipped over before the second side can be played.

Players are known that were provided with two lasers on their heads to enable the players to play different types of media including LDs, CDs, DVDs, etc. There were also players also include mechanisms that switch the heads from one side of a disc to the other. However, upon the switching of the heads, the direction of rotation of the disc has to be changed. In addition, the players are incapable of seamless play when switching from one side to the other.

As far as is presently known, the only device that has two (or more) heads and reads both sides of a disc while the disc is rotated in a single direction is a magnetic hard drive. However, this type of disc has only one layer of information on each side. Moreover, the data on the disc are arranged in concentric circles rather than spiral tracks, and therefore the drive needs a reading mechanism that simply steps from one concentric circle to another without the need to track a continuous spiral.

SUMMARY OF THE INVENTION

An optical disc can have two sides, each side having one or more data layers. Advantageously, the data can be arranged on each layer along spirals, with the spirals on one side being oriented in a first direction and the spirals on the second side being oriented in the opposite direction, as viewed from the respective side. In other words the two spirals are mirror images of each other.

In one aspect of the invention, the data is arranged on a spiral track that extends between two points that are at least radially spaced from each other, one point being disposed at, or near the hub, and the other point being disposed at, or near the outer periphery of the disc. For the sake of simplicity, the track is described as extending between the outer periphery and the inner hub of the disc, or vice versa.

Conventional optical discs are played by rotating them in a predetermined direction and reading the data on only one side. One result of the disc arrangement with reverse spirals on the two sides is that when the disc is inserted into a player upside down, the player is unable to read the data.

In the present invention, a player is provided in one embodiment with a manual switch that can be used to indicate the type of disc that is being inserted into the player. Based on this information, the player reads data from one side and then the other without needing to turn the disc upside down.

Alternatively, the player determines what kind of disc has been inserted therein by analyzing whether data can be read from either side either side in a standard direction, or whether reverse data is present.

Conventional discs are read by rotating the disc in one direction for one side and the other direction for the other side.

The improved discs are read by rotating the disc in one direction for both sides without removing the disc from the player.

The player is provided disc detector that detects what kind of disc is inserted into the player and a controller coupled to the disc detector then rotates the disc in the desired direction to allow a laser head to read the data.

In another aspect of the invention, the player includes a rotation detector that analyzes a disc side and determines in which direction in should be rotate so that the data can be read.

BRIEF DESCRIPTION OF THE DRAWINGS

FIG. 1A shows a plan view of a conventional DVD disc;

FIG. 1B shows a conventional laser head reading side A of the standard disc of FIG. 1;

FIGS. 1E-1J show side views of various discs constructed in accordance with this invention, and the respective sequences in which they are read by a single laser head;

FIG. 3 illustrates a block diagram of a player constructed in accordance with this invention with a single head and a yoke for reading discs;

FIG. 3A shows details of the yoke of FIG. 3;

FIGS. 7, 8 and 9 show data segments on sides A and B of a disc that are played at different speeds;

FIG. 10 shows a scheme of interleaving data segments from different sides of a DVD in accordance with this invention;

DETAILED DESCRIPTION OF THE INVENTION

The present invention provides various novel configurations and arrangements for optical discs having several data layers. The invention is described in detail for a DVD-18 with four data layers—two on each side. As will become clear from the following description, at least some aspects of the invention are applicable to other types of discs. For example, the invention may be applicable to optical discs with at least one data layer on each side and one data layer on the other, or optical discs having two or more data layers at least on one side.

For the purposes of this description, the following convention is adopted for a double-layer double-sided disc. The two sides of a disc are designated as side A or the top side, shown in FIG. 1A, and side B or the bottom side, side A being the side that is normally read first. Each side has two data-storing layers: layer 0 or the outer layer, and layer 1 or the inner layer. Hence, all discs discussed herein have their layers arranged in the following order: A0, A1, B1 and B0, as shown in FIG. 1B. The inventors recognize that the content of each side is normally partitioned into several segments corresponding to different audio-visual programs or other types of data, and that these segments are normally referred to as 'tracks'. However, in the present invention, the term 'track' is used to mean a continuous data path disposed on a single layer of the disc along a spiral extending between two points at least radially spaced from each other, one point being disposed closer to the hub, and the second point being disposed closer to the outer periphery. For the sake of brevity, the track or spiral is said to start or terminate at the periphery or at the hub, it being understood that the terms are understood to cover tracks starting or terminating at points that may be disposed at a distance radially spaced from the hub or the periphery. As discussed in more detail below, on any given track the data are arranged sequentially in segments having specific identifying indicia and using standard data formats. The data can be read sequentially by accessing each segment along the track.

Alternatively, in some cases some data may be skipped or random data access may be required. In this latter case, each data segment on a track is accessed on the fly. The tracks are referred to herein as A1, A0, B1, B0 corresponding to the respective layers of a disc. Each track extends along either a right- or left-handed spiral and each spiral extends from the hub to the periphery or vice versa, as defined above.

Figure 1D:
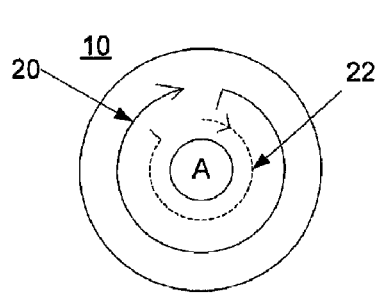
FIG. 1D shows a plan view of a second side of an improved disc constructed in accordance with this invention.
Figure 1D:
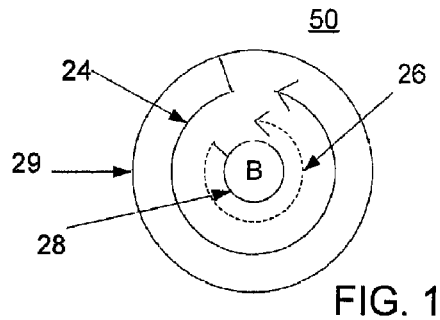

Referring now to FIGS. 1A and 1B, disc 10 is a standard or conventional DVD disc having the four layers A0, A1, B0 and B1. Conventionally, data are read by a laser head 18, first from track A0 starting at the hub 28 and continuing outwardly. The area 14 on the disc 10 disposed at the outer periphery is defined by the DVD standards as the middle area. The middle area is the area on a disc where a laser head is refocused so that it can read data from a different layer. In FIGS. 1A-1D, the laser head 18 first reads the data from layer A0 or B0, and is then refocused so that it can read data from layer A1 or B1, respectively.

Getting back to FIGS. 1A and 1B, once the laser head 18 reaches middle area 14, it is then switched to read data on track A1 and the laser head 18 then follows track A1 inwardly back from the periphery toward the hub 28 until it reaches the lead-out area 16. This mode of operation allows the data to be read almost seamlessly from both tracks of side A, with track-switching buffering required only while the laser head is being refocused in the middle area 14.

To establish a frame of reference, looking at the disc from side A, track A0 in FIG. 1A is defined as being arranged in a right-handed spiral 20. Still looking at the disc from side A, track A1 also follows a right-handed but inward spiral 22 that moves radially from the middle area 14 to the hub and the lead-out area 16. The path taken by the head 18 to read side A of disc 10 is shown symbolically in FIG. 1B by arrow 30. This path is referred to in the industry as an opposite track path, or OTP. The data along this path, that is, the data on tracks A0 and A1 are read without changing the direction of the disk rotation. (In some special situations, data are not read seamlessly but instead is read randomly from either layer 0 or layer 1. In this case, track A1 is still arranged in a right-handed spiral, but the data are read starting from the hub. This arrangement is referred to in the industry as a parallel track path or PTP.)

Figure 1C:
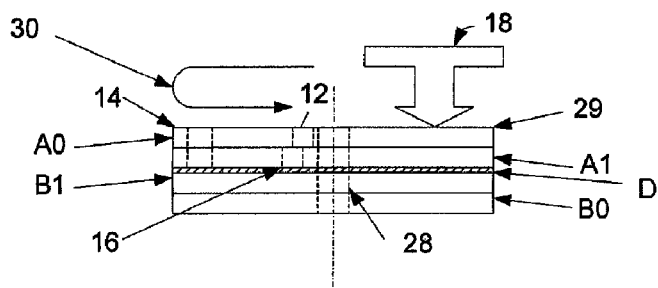
FIG. 1C shows a conventional laser head reading side B of the standard disc of FIG. 1.
Figure 1C:
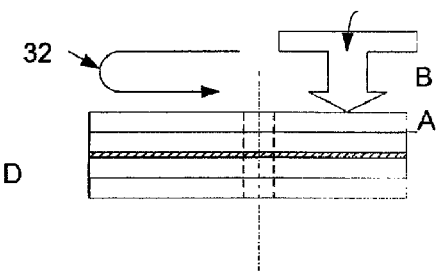

When a player is finished reading side A, the disc 10 is removed and reversed. From the perspective of the laser head 18, side B with its tracks B0 and B1 looks exactly the same as side A, with the data arranged along spirals 20, 22, and being read in exactly the same manner, as indicated in FIG. 1C by arrow 32.

In the present invention, several configurations and arrangements are disclosed for a novel or improved disc 50 shown in FIG. 1D. The disc 50 is a double-sided double-layer optical disc with a hub 28 and a periphery 29. From side A of this disc 50, the tracks A0 and A1 are aligned along a right-handed spiral oriented in the same direction as on disc 10. However, looking through the disc from side A at all the tracks simultaneously, all the tracks follow a right-handed spiral. This is accomplished by orienting tracks A0, A1 along a right-handed spiral, and orienting tracks B0, B1 along a left-handed spiral, as seen from the respective sides. As a result, were the disc 50 to be played by a conventional player, when the disc is flipped, the player would have to switch the direction in which the disc is rotated. Therefore, the data are arranged on layers A0, A1, B0 and B1 in a manner that allows data to be read from both sides of the disc 50 substantially seamlessly, i.e., without the need to reverse the disc in a new type of player and without changing the direction of rotation of the disc.

Figure 2:
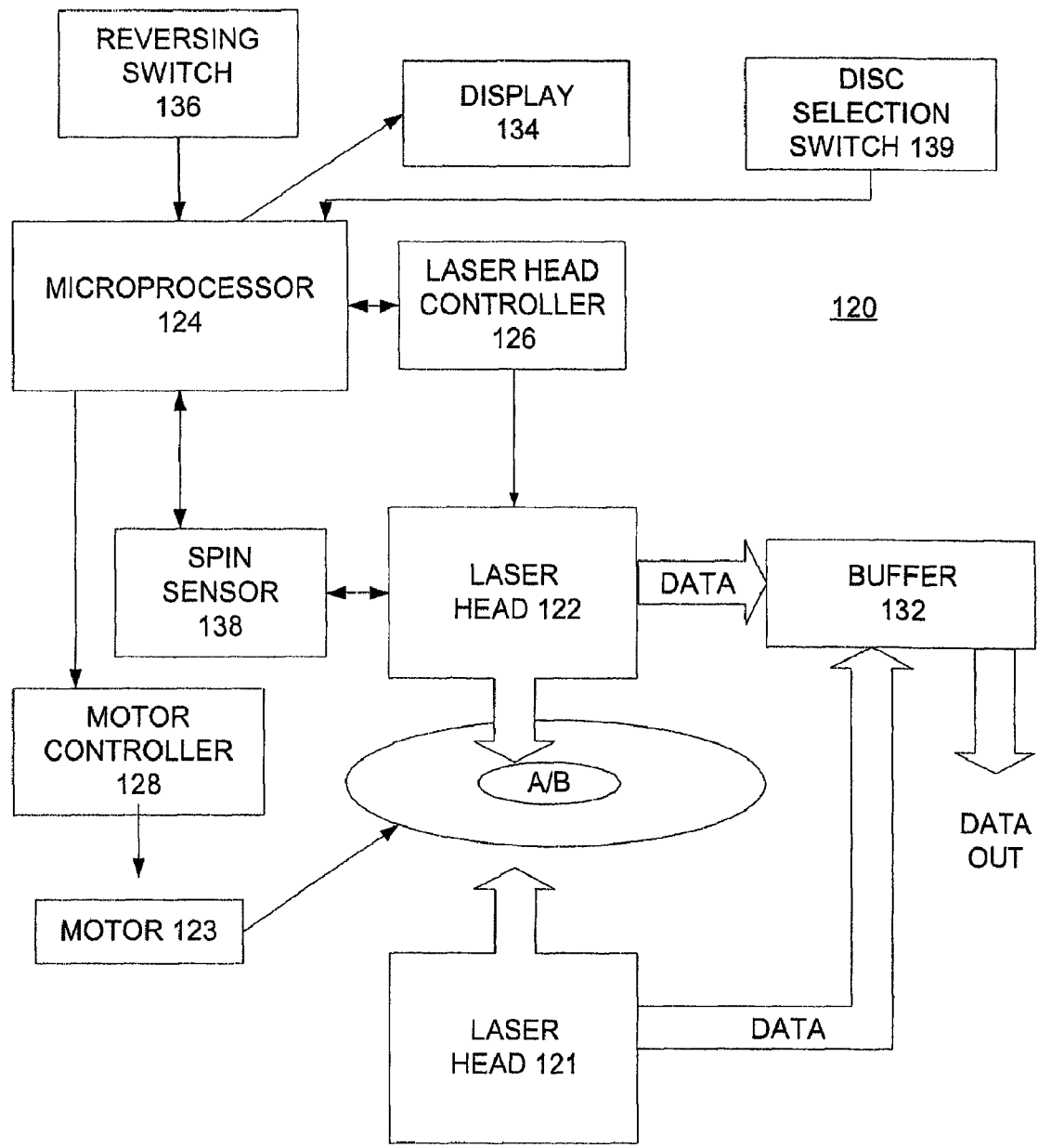
FIG. 2 shows a block diagram of a player with two laser heads for reading a disc in accordance with this invention.

FIG. 2 shows the preferred embodiment of a player for reading disc 50. Player 120 has two laser heads 121, 122, a motor 123, a microprocessor 124, a laser head controller 126, and a motor controller 128. in response to control signals from the microprocessor 124, the laser head controller 126 reciprocate the laser heads 121, 122 radially inwardly or outwardly as required to read data from the disc 50. The data from the laser heads are fed to a buffer 132 and are then provided for further processing. In this manner, the two laser heads 121, 122 can be positioned independently along the respective sides of the disc 50. The only track-switching dead time for which buffering is required is the time needed to switch the input of buffer 132 from one laser head to the other.

The motor controller receives commands from the microprocessor and generates control signals to the motor 123 to rotate disc 50 either at a selectable speed and, if necessary, in either a clockwise or counterclockwise. Alternatively, depending on the mode of operation for the player 120, the motor may rotate the disc 50 only a single direction.

Spin sensor or disc rotation detector 138 selectively receives signals from the laser head 122 and/or laser head 120 and uses these signals to determine the direction in which data on the respective side of disc 50 (or a portion thereof) is written. Several embodiments for performing this function are disclosed below in conjunction with FIGS. 5-5D and 6.

The player 120 may also be provided with a display 134 that provides information and/or instructions to the customer. In addition, the player 120 may be provided with some manual controls, such as switch 136 that may be used to operate the player 120 either in a normal or a reverse mode, a disc selection switch 140 that may be used to select the type of disc to be played, and so on. Of course, the player 120 also may other types of control and manual switches for performing various conventional operations such as STOP, EJECT, FAST FORWARD, FAST REVERSE, and so on. These switches have been omitted for the sake of clarity.

Several modes of operation for player 120 are now described. In the simplest mode, a disc 50 is loaded into the player and the microprocessor assumes that the disc 50 is in a default orientation, for example with side A facing laser head 121 and side B facing laser head 122. The microprocessor 124 issues commands to the motor to start rotating the disc 50 in default direction, for example clockwise, and the laser head controller 126 is ordered to move the laser heads to the respective lead-in area and the data is read from the disc in a predetermined order. A typical order may be A0-A1-B0-B1, but of course the data may be read in different orders as well, as discussed in more detail below, in conjunction with FIGS. 1D-1L. If the disc 50 is inserted upside down, the player 120 cannot read the data and a message is generated to the display 134 indicating a problem, or requesting the user to remove the disc, reverse it and reinsert it.

The player 120 can also be programmed so that it can operate in a normal mode, similar to the simple mode described above, or a reverse mode. In the reverse mode, the microprocessor assumes that the disc 50 is upside down and it reverses the direction of rotation of the disc. The laser head assignments are also reversed. That is, laser head 122 is assigned to read side A and laser head 121 is assigned to read side B, or vice versa. In this embodiment, the player 120 initially attempts to read data from the disc using its default settings. If no data can be read, the microprocessor can either generate the error message and then the user can activate switch 136 thereby initiating the reverse mode. Alternatively, the microprocessor can initiate the reverse mode automatically, e.g., without any intervention from the user, if no data can be read.

Figure 4:
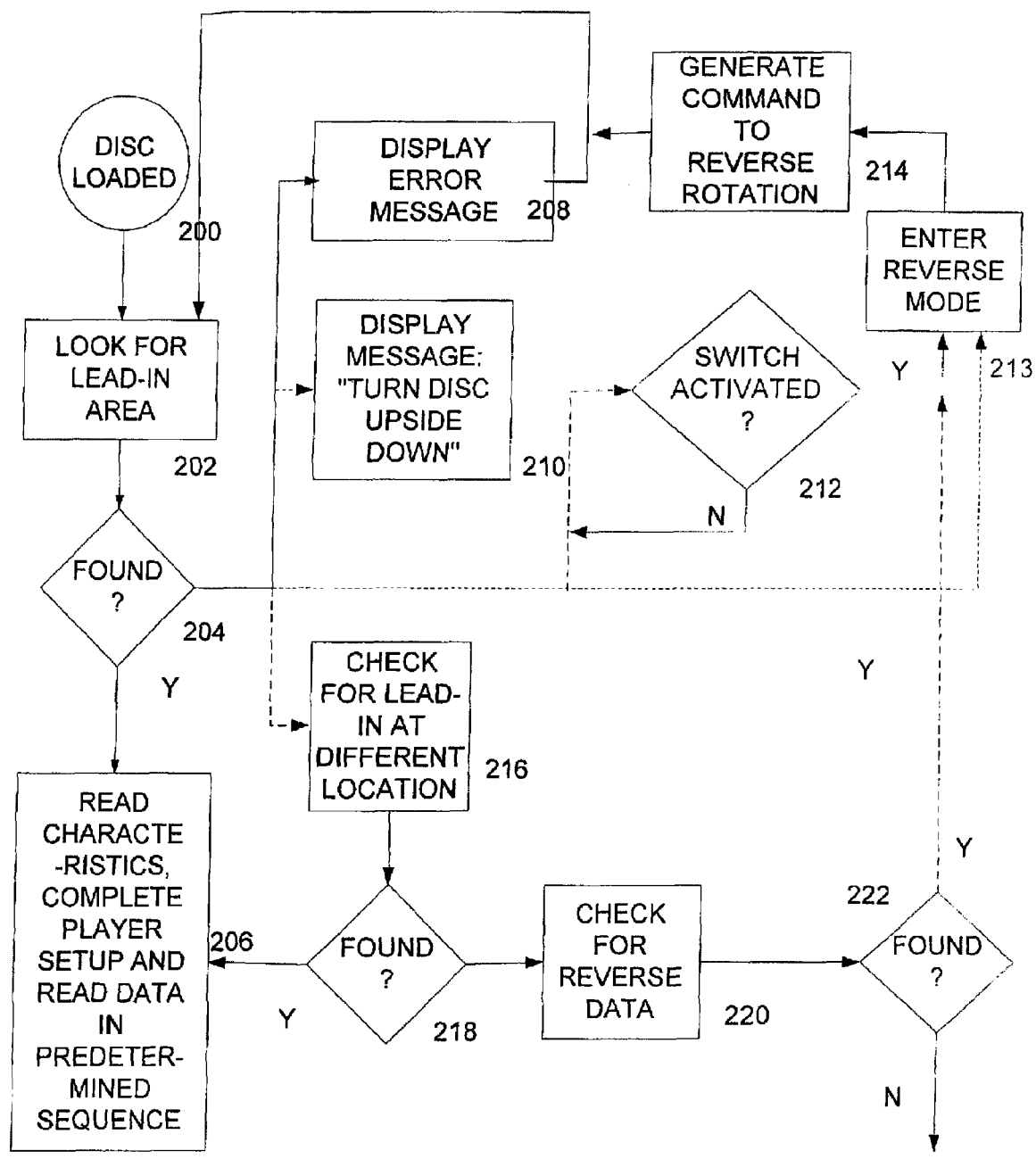
FIG. 4 shows a flow chart for operating the player of FIG. 2 in a smart mode.

Another mode of operation for the player is a so-called "smart" mode. In this mode, if the player cannot read the data from the disc in the normal mode, it then attempts to get some information about the disc that would indicate the manner in which is to be played or whether the disc is upside down. This mode of operation is illustrated in the flow chart of FIG. 4, together with the modes previously described. In step 200 the disc is loaded. In step 202 the player looks for a lead-in area at a default location, usually adjacent to the hub. If a lead-in area is found in step 204, then in step 206 the data from the lead-in area are read, including the characteristics of the disc. The player 120 commences to read the data from the disc, using, for example, one of the sequences described in more detail below.

As discussed above, in one mode, if the lead-in area is not found then in an error message is displayed (Step 208), or a message is displayed asking the user to turn the disc upside down and reinsert it (Step 210).

Alternatively, as discussed above, since the player 120 has laser heads on both sides anyway, it can be easily adapted to operate in the reverse mode in which it reads a disc even if it is upside down. For the reverse mode, if in step 204 no lead-in area is found, it is assumed that the disc is upside down and that it will be read in this orientation. In one embodiment (step 212), the microprocessor 124 checks to see if the switch 136 is activated. When a user activates the switch, the microprocessor enters into the reverse mode (step 213), sends a command to the motor controller 128 to reverse the direction of rotation of the disc (step 214), and also reverses the designations of heads 121 and 122. If the switch 136 is not activated within a predetermined amount of time, the microprocessor generates an error message.

In another embodiment of the invention, from step 204 the microprocessor 134 automatically enters into the reverse mode (step 213) and user action is not even required.

In the smart mode, if the lead-in area is not found at the default location, then in step 216 a search is made for the lead-in area at other location, such as at the periphery, or on the other side of the disc. In step 218, if the lead-in area is found, the microprocessor obtains and follows the instructions from the lead-in area and operates accordingly (step 206).

If the lead-in area is not found in step 218, then in step 220 a check is performed for reverse data, i.e., that can be read only if the rotation of the disc 50 is reversed. One means of implementing this check is by stopping the disc, reversing it and looking again for a readable lead-in area. Several other means of checking for reverse data is discussed below. Several embodiments for performing this function are disclosed below in conjunction with FIGS. 5-5D and 6. If reverse data is found then in step 213 the microprocessor enters a reverse mode. Otherwise, an error message is generated.

Figure 4A:
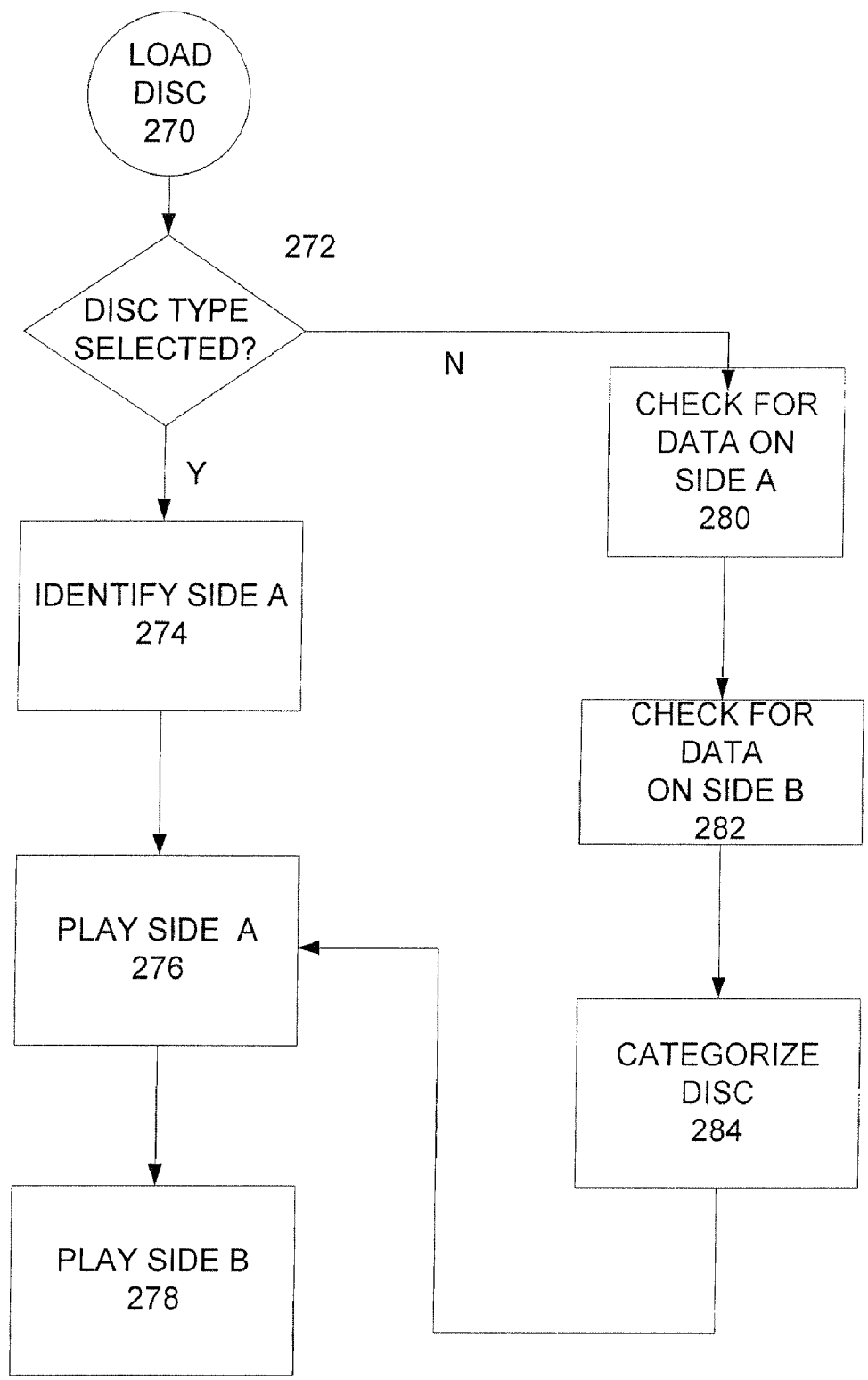
FIG. 4A shows a flow chart for operating the player of FIG. 2 in a universal mode.

Another mode of operation for the player 120 is a universal mode in which the player accepts either a conventional disc, such as the one shown in FIGS. 1A-1C or the improved disc of FIG. 1D. This mode of operation is shown in FIG. 4A. In step 270 a disc is loaded. In one embodiment, the user can select a disc type using disc selection switch 139 (shown in FIG. 2). For example, the user may designate the disc inserted into the player as a conventional disc or an improved disc. This selection takes place in step 272. Next, in step 274, the microprocessor identifies side A of the disc using the techniques discussed above. In step 276 side A is played and in step 278 side B is played.

If no selection is made in step 272, the player 120 determines automatically the type of disc inserted as follows. In step 280 the microprocessor assumes that one of the sides is side A, the disc is rotated in a predetermined direction and the side is checked for data either in the normal or in the reverse direction. In step 282 the check is repeated for side B. Next, in step 284 the disc is categorized. That is if data is found on both sides in the normal direction, the disc is an improved disc and is right side up. If reverse data is found on both sides, the disc is an improved disc, and it is upside down. If data is found in the normal direction on one side and reverse data is found on the other side, the disc is a conventional disc. Finally, a single-sided disc will have no data on one side. Once the disc has been categorized, sides A and B are played in steps 276 and 278 (if the disc has data only on side A, then step 278 is skipped). As discussed above, a conventional disc is played by rotating it in one direction for side A and rotating it in the opposite direction for side B. An improved disc is played by rotating the disc in the same direction for both sides. The microprocessor 124, the switches 136 and 139 and spin sensor 138 cooperate to form a disc detector to determine what kind of a disc is being inserted into the player.

Figure 2A:
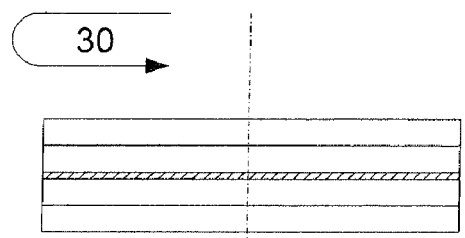
FIG. 2A depicts how the two laser heads of the player of FIG. 2 read a disc.
Figure 2B:
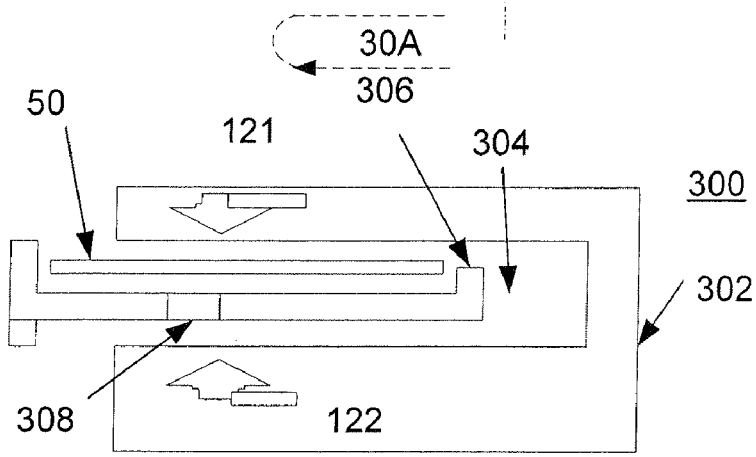
FIG. 2B shows a cross-sectional view of a DVD drive primarily useful in a PC.
Figure 2C:
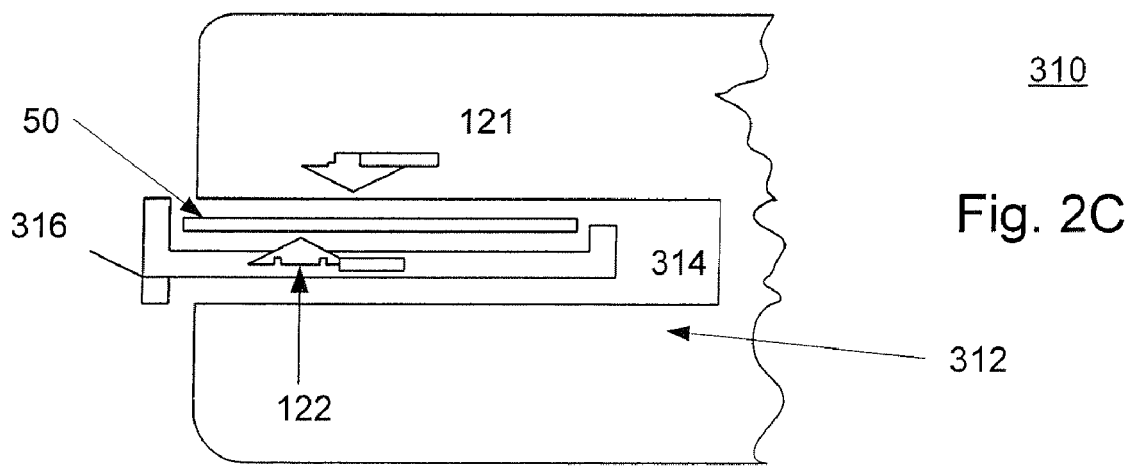
FIG. 2C shows a cross-sectional view of a DVD drive primarily useful in a mobile PC.
Figure 2D:
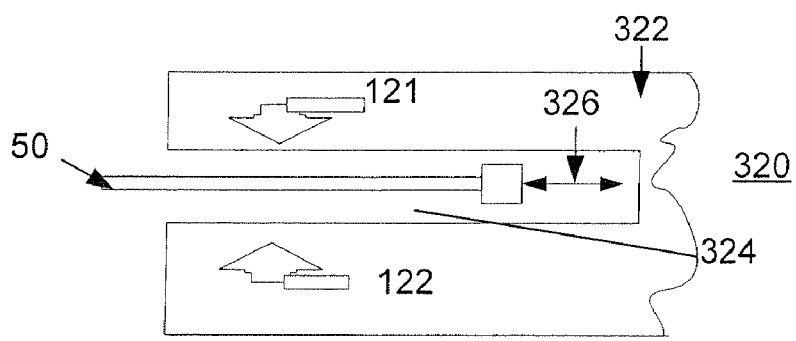
FIG. 2D shows a cross sectional view of a trayless DVD drive useful in a PC or laptop.

FIGS. 2B-2D show some configurations for implementing the concepts of FIG. 2. FIG. 2B shows a side sectional view of a DVD drive 300. This drive may be an accessory mounted in the housing of a standard PC (not shown) or it may be an external device connected to a PC through a standard interface, such as a USB bus, etc. Alternatively, the DVD drive 300 may be incorporated into a stand-alone player device that can be connected either to a TV set, or to a multimedia entertainment system.

The drive 300 includes a case 302 formed with a cavity 304 that accepts a tray 306. The tray 306 can be opened and closed in the usual manner and is used to hold and rotatably support the DVD disc 50 that may have any one of the configurations and arrangements discussed above. The drive 300 also includes standard servo-mechanisms for automatically moving the tray in and out of the case 302 in response to commands, and for rotating the disc 50. These mechanisms are omitted for the sake of clarity. Importantly, the two laser heads 121, 122 are provided within the case 302. Laser head 121 is oriented so that it can read the top surface of the disc 50 while laser head 122 reads the bottom surface through an opening 308 in the tray. The laser heads are moved back and forth radially along the surfaces of the disc 50 by standard devices (not shown).

FIG. 2C shows an optical disc drive 310 that may also be used in a standard PC, but is particularly suited for portable devices, such as laptops, PC tablets, etc., where space and weight must be minimized. This device 310 has a case 312 with an opening 314 accepting a tray 316. The tray 316 is provided with the internal laser head 122 positioned to read the bottom side of the optical disc 50. A second head 121 is mounted within the case 312 and is oriented toward the optical disc 50 as well. Again, auxiliary means for moving the tray and the heads, and the motor rotating the disc 50 have all been omitted from the drawing. The case 312 is an integral element that is also used to hold a keyboard, various input and output ports, and pointing devices. The case may also incorporate a hinged display. These standard elements have also been omitted from the drawing.

FIG. 2D shows an optical drive 320 that is trayless. The drive 320 includes a case 322 with a cavity 324. Two laser heads 121, 122 are mounted in the case 322, with laser head 121 pointing downward toward cavity 324 and laser head 122 pointing upward into the cavity 324, as shown. The disc 50 can be introduced partially into the cavity 324. A robotic arm 326 grabs the disc 50, draws it inside the cavity and mounts it on a rotating mechanism (not shown). Once it is in the proper position, the disc is rotated and the laser heads 121, 122 read the data from the disc in the manner described above.

FIG. 3 shows an alternate embodiment of the invention for reading disc 50, the embodiment consisting of a player 100 with a single laser head or read head 102. In this embodiment, the disc 50 is rotated in the clockwise direction R by a motor 103. The operation of the player 100 is controlled by a microprocessor or controller 104. The microprocessor 104 sends control signals to a laser head controller 106, a motor controller 108 and a yoke 110 which may include its own controller (not shown). The laser head controller 106 is used to control the position of the laser head 102 radially along the surface of the disc 50 with a linear motor (not shown). The data read by the laser head 102 are fed to a buffer 112. From the buffer 112 the data are handled by a further processor (not shown) for conversion to a multimedia program, an audio program, etc. The motor controller 108 operates the motor 103 which spins the disc 50 in a conventional manner. A spin sensor 138 is also provided which selectively detects signals sensed by the laser head 122 (and/or 121).

The yoke 110 is used to switch the laser head 102 from one side of the disc 50 to the other, under the control of microprocessor 104, to permit the laser head 102 to read data from either side A or side B without having to flip the disc. For example, the yoke may include two parallel C-shaped rails (one such rail 111 being visible in FIG. 3A) extending from one side of the disc 50 to the other. The head 102 rides on the rails 111 as it is reciprocated between the inner hub and the periphery of the disc 50 and between the two sides of the disc 50 as described below.

Figure 1E:
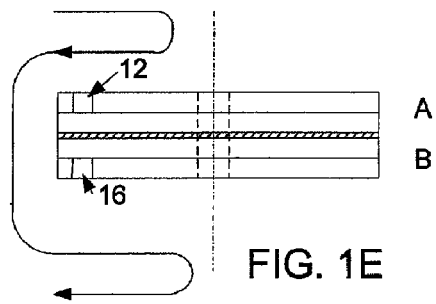

The player 100 can be used to read discs having tracks laid out in several configurations as illustrated in FIGS. 1E-1J. At the outset, it should be understood that data can be laid out in tracks A0, B0 along a spiral going either from the hub 28 toward the outer edge or periphery 29 (as in the prior art) or from the periphery 29 toward the hub 28. In FIG. 1E, the player 100 initially positions its laser head 102 along side A of the disc 50, at a peripheral lead-in area 12, and the laser head is focused on layer A0. The laser head 102 is then moved radially inward by laser head controller 106 until it reaches the hub 28 (shown in FIG. 1D). The laser head 102 is then focused to read layer A1, and moved back radially from the hub 28 toward the periphery of the disc 50.

When the laser head 102 finishes reading the data on layer A1, the yoke 110 moves the laser head 102 to the position 102A in FIGS. 3, 3A, thereby allowing it to read side B. The laser head 102 is now focused on layer B1 and the laser head 102 is moved radially inwardly to read the data on this layer without changing the direction of rotation of the disc. When the hub is reached, the laser head 102 is refocused to read layer B0, and the laser head 102 is then moved back radially until it reaches the lead-out area 16.

Throughout this operation, the motor 103 rotates the disc 50 in the same direction. In this manner, the player 100 is able to read the disc 50 continuously from one side to the other in an essentially seamless manner.

Figure 1F:
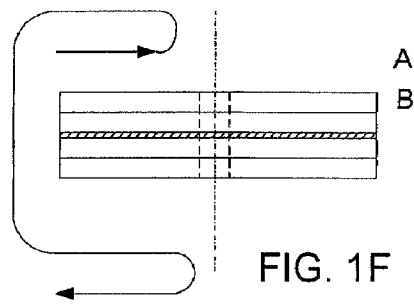
Figure 1G:
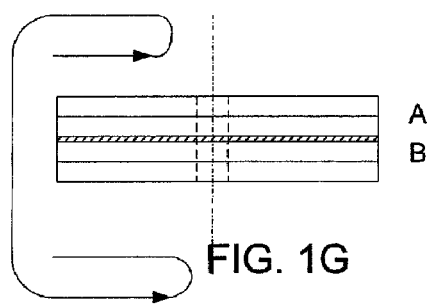
Figure 1H:
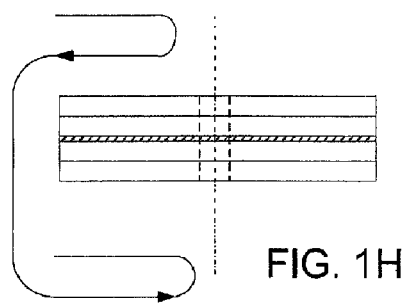

FIGS. 1F, 1G, and 1H illustrate other track read sequences in which the head 102 always starts at the outer periphery of one side and ends at the outer periphery of the other. Moreover, in all these sequences, the read head finishes reading side A at the outer periphery and starts reading side B from the outer periphery. This feature insures that the dead time (during which the laser head 102 is being switched from one disc side to the other) is minimal. The size of the buffer 112 must be sufficiently large to allow the storage and retrieval of data for a sufficient length of time to cover this dead time. Depending on the direction in which each track is read, the data are laid out from either the hub to the periphery or vice versa.

Other configurations in which the laser head does not start and finish on both sides at the outer edge result in a longer dead time. For example, in the configuration of FIG. 1I the layers of the disc are read in the same order as on standard disc 10, i.e., A0, A1, B0, B1. However, the dead time is extended because between layers A1 and B0 the head must travel radially across the disc before it is switched over to side B by the yoke 102. In FIG. 1J the data are read in the order A0, B0, B0, A1. In this arrangement, there are two dead times since the laser head 102 must be switched twice between the two sides, as shown.

The configurations illustrated in FIGS. 1E-1J are summarized in the following table, where O indicates sequential data being recorded radially outwardly and I indicates sequential data being recorded radially inwardly.

|              | A0 | A1 | B1 | B0 |
|---|---|---|---|---|
| FIGS. 1B, 1C | O  | I  | O  | I  |
| FIG. 1E      | I  | O  | I  | O  |
| FIG. 1F      | O  | I  | I  | O  |
| FIG. 1G      | O  | I  | O  | I  |
| FIG. 1H      | I  | O  | O  | I  |
| FIG. 1I      | O  | I  | O  | I  |
| FIG. 1J      | O  | I  | O  | I  |

In all of these arrangements, the laser head starts on side A and the data follow a right-handed spiral on side A and a left-handed spiral on side B. Of course, the disc 50 may be provided with other track read sequences as well.

The player 120 of FIG. 2 with two heads can also read all the tracks shown in FIGS. 1D-1J. In addition, this player 120 can also read discs which might be difficult to read with player 100 having a single laser head and a yoke. For example, FIG. 2A shows a disc with sides A and B having a standard arrangement shown in FIGS. 1A-1C except that, of course, in accordance with our invention, the data on side B follows a left-handed spiral. The player 120 reads the two sides in the following order: A0, A1, B0, B1 as shown in FIG. 2A. The motions of the heads 121, 122 are shown by the arrows 30, 30A. Arrow 30A is dashed to indicate that head 121 reads side B after head 122 finishes reading side A. When reading the disc of FIG. 2A with the player of FIG. 3, the dead time may be excessive, requiring an oversized buffer. The player of FIG. 2 can have a smaller buffer, at the expense of a second laser head.

As discussed above, all discs have a lead-in area 12, which is used to provide certain information needed by the player and/or the user. In the present invention, this lead-in area may also be used to define the specific characteristics of the disc 50, including, for instance, the configuration of the layers and the sequence (such as one of the sequences of FIGS. 1E-1J) in which they are to be read.

Another method is to have the player search for the lead-in area, or another area placed on the disc for this purpose, and then determine from this data the characteristics of the disc, including the track read configuration. Microprocessor 124 in FIG. 2 is easily programmed to perform this task. (A conventional player similarly reads lead-in data and governs its operation accordingly.)

Figure 5:
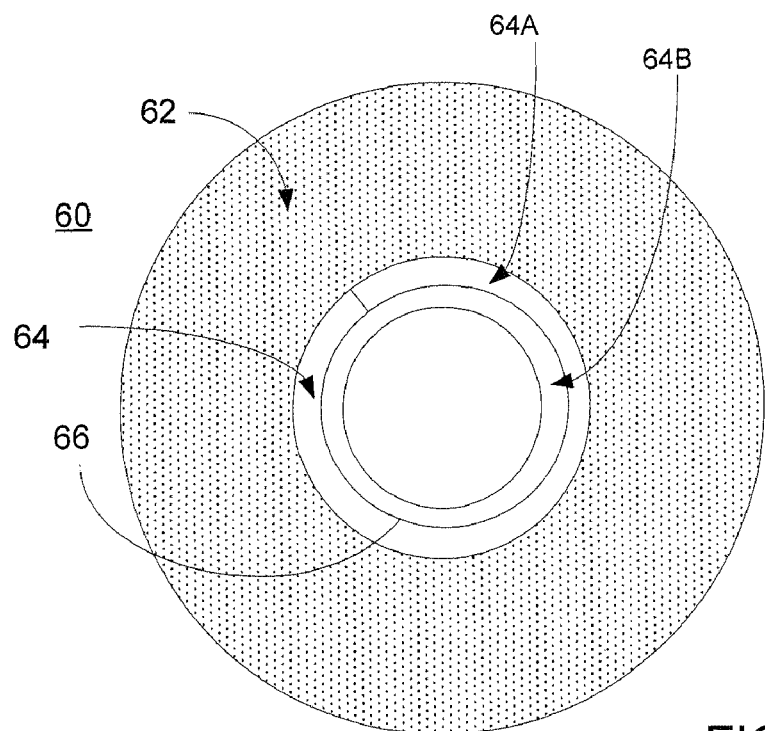
FIG. 5 shows a plan view of a disc with an auxiliary data area that is used in one embodiment by the players of FIGS. 2 and 3 to switch to a reverse mode of operation.

In yet another embodiment of the invention, a disc 60 shown in FIG. 5 is provided with a main data area or program section 62 and an auxiliary data area or special section 64 that is disposed adjacent to the hub 66. The main data area 62 including the lead-in area (not shown) consists of data arranged along a left spiral. The auxiliary data area 64 contains control data arranged along an opposite spiral, (e.g., a right-handed spiral) and thus the data identifies characteristics of disc 60. The player 120 is preprogrammed to rotate the disc in a direction that allows it to read data in a right-handed spiral and it looks for the lead-in area. If no such area is found, then in step 216 the microprocessor sends a command to the laser head 121 to look for the auxiliary data area 64 (in the left spiral configuration). If this auxiliary data area is found in step 218, then in step 213 the microprocessor 124 goes into the reverse mode. Of course, instead of going into the reverse mode, the microprocessor may just generate a message to the user similar to the message discussed above to reverse the disc or to activate the reverse rotation switch.

Figure 5A:
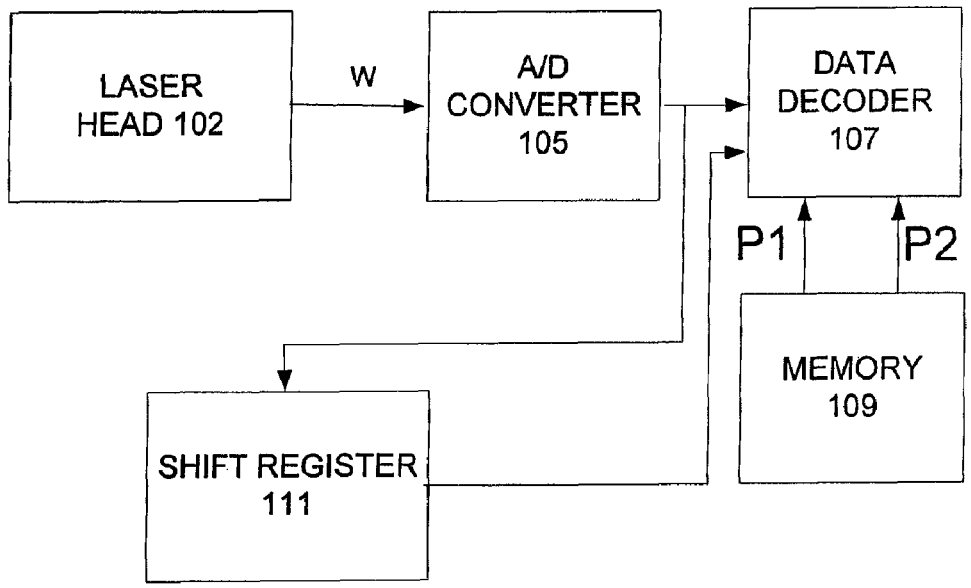
FIG. 5A shows a circuit used to detect the proper direction of rotation for a disc.

In another embodiment of the invention, the player 120 is adapted to read electronically at least a portion of a data track or section even if a disc is rotating in the wrong direction. A portion of the player 120 that has been modified for this mode of operation is shown in FIG. 5A. In this Figure, the laser head 102 generates an analog waveshape W. A typical waveshape of this kind is shown in FIG. 5B. Waveshape W is provided to an A/D converter 105 that samples the waveshape W and generates a corresponding data stream. The circuitry further includes a data decoder 107, a memory 109, and, optionally a shift register 11. These elements can be implemented as discrete circuits or can be implemented by software in the microprocessor 124 or spin sensor 138.

Figure 5C:
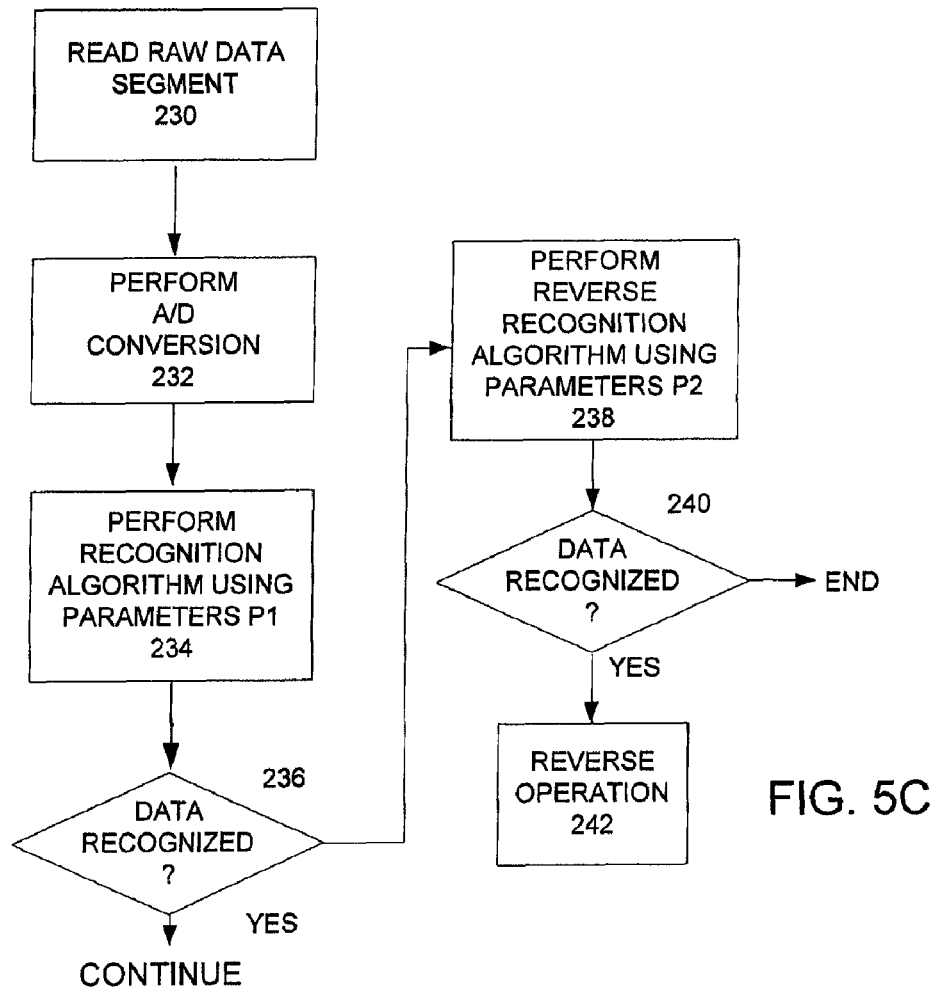
FIG. 5C shows a flow chart for a first mode of operation of the circuit of FIG. 5A.
Figure 5B:
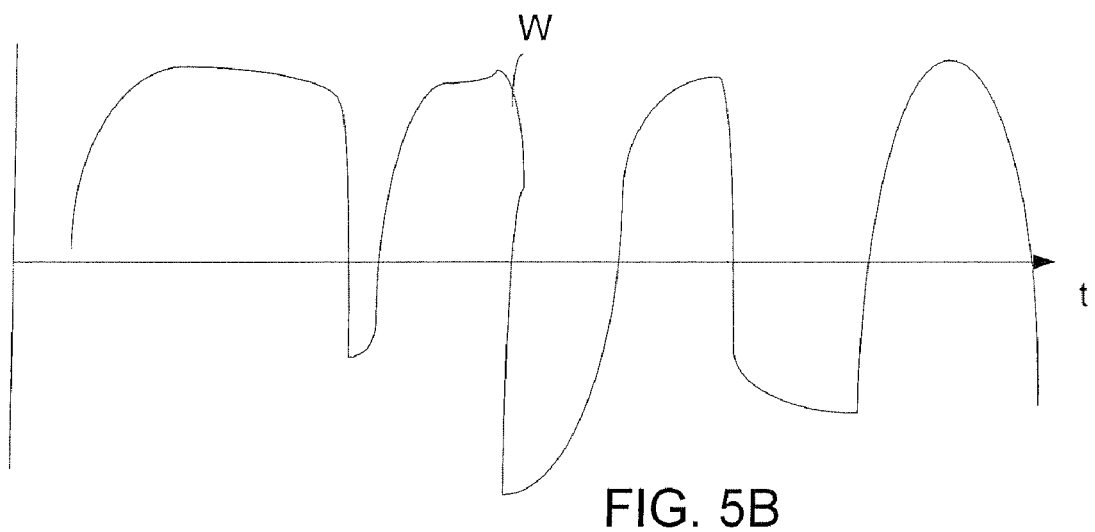
FIG. 5B shows a typical analog waveform for a data portion on a disc.

One mode of operation for the circuit of FIG. 5A is shown in FIG. 5C. In step 230 the raw data corresponding to the analog waveshape W is acquired. In step 232 the A/D conversion is performed by converter 105. In step 234 the decoder performs a decoding recognition algorithm based on a set of parameters P1 from the memory 109 and attempts to convert the digital stream from the converter 105 into data. In step 236 the data decoder 107 determines whether the sample stream can be converted into valid data.

If data is not recognized in step 236, then in step 238 the data decoder 107 performs a reverse recognition algorithm on the sample stream using, if necessary, a second set of parameters P2 from memory 109. The reverse algorithm is determined by obtaining with laser head 102 a set of samples of a known data segment and analyzing these samples.

If in step 240 data obtained from the reverse algorithm is recognized as valid data, then the player enters into a reverse mode in step 242.

Figure 5D:
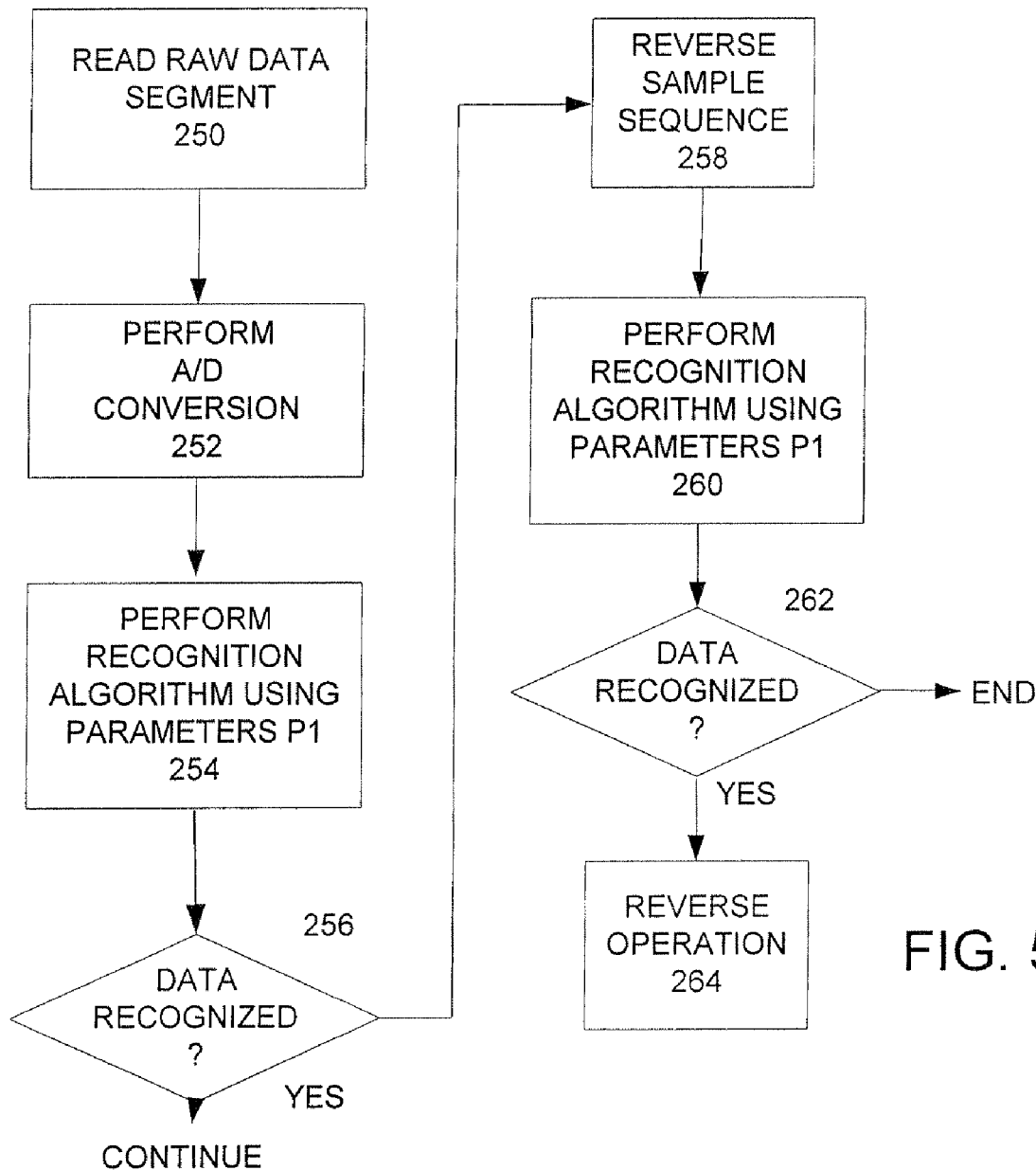
FIG. 5D shows a flow chart for a second mode of operation of the circuit of FIG. 5A.

Another mode of operation for the circuit of FIG. 5A is shown in FIG. 5D. in this mode, steps 250, 252, 254, 256 are similar to steps 230, 232, 234 and 236. In this mode, if in step 256 no valid data is recognized, then in step 258 a predetermined number of digital samples are stored in sequence in the shift register 111 and then read out to the decoder 107 in reverse order. That is the sample that is stored first is read out last and the sample that is stored last is read first. In step 260 the reverse sequence is analyzed using the normal recognition algorithm and parameters P1. If valid data is recognized in step 262 then the player enters into a reverse mode in step 264.

Figure 6:
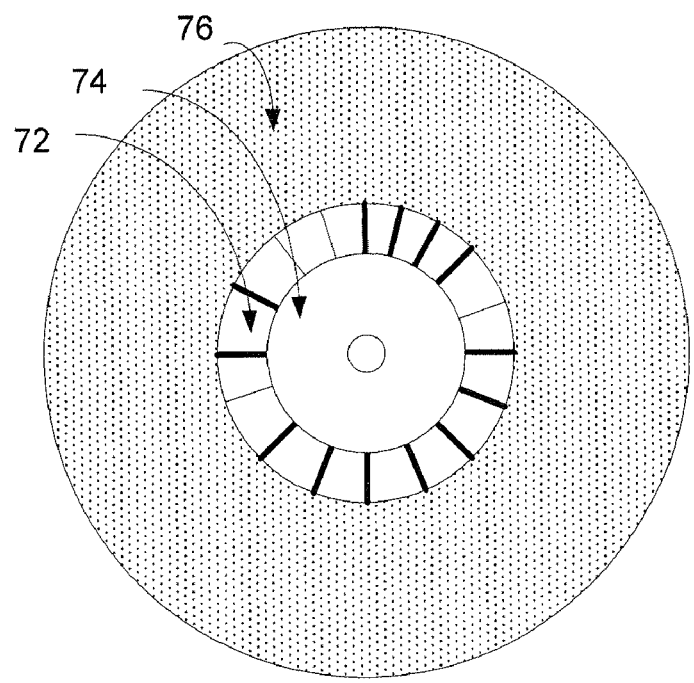
FIG. 6 shows a plan view of a disc with another data area that carries a special bi-directional bit stream that is used by the players of FIGS. 2 and 3 to determine the orientation and/or proper rotation direction of the respective disc.

In another embodiment of the invention, the player 120 uses an optical or other similar means of determining the proper rotation of a disc. For this purpose, as shown in FIG. 6, a disc 70 is provided with a special area 72. Preferably, area 72 is disposed near the hub 74, and radially inwardly of the area 76 used for conventional data. Area 72 may be a part of the BCA (burst cutting area) or may be a separate portion on the disc 70. Moreover, area 72 can be provided on one or both sides of the disc 70. The area 72 may also include the lead-in area.

Area 72 is used to hold a special series of signals that can be detected by with the disc 70 spinning in either clockwise or counterclockwise direction. These signals are selected in such a manner that when a laser head reads these bits, the microprocessor can determine whether the disc 70 is spinning in the correct direction or not. For example, the series of signals could be decoded into bits can consist of groups of 0's and 1's with the number of 0's and 1's in each group increasing, as follows:

001100001111000000001111111.

If the disc 70 is spinning in the right direction, then when special area 72 is read, the sequence S is detected with the number of 0's and 1's in each group increasing. When the disc 70 is spinning in the wrong direction, the sequence is read in the reverse order, and the number of 0's and 1's decreases from group to group.

As shown in FIG. 2, the player 120 is provided with a spin sensor 138 which acts as a rotation detector that operates on the series of bits in area 72 read by laser head 122 and counts the numbers of 0's and 1's in each sequential group. If the numbers are increasing, the disc is spinning in the right direction, and the spin sensor 138 generates an output indicating that no rotation reversal is necessary. If the numbers of 0's and 1's are decreasing for sequential groups, the disc 70 is spinning in the wrong direction, and the spin sensor 138 generates a signal to the microprocessor 124 to indicate that a rotation reversal is necessary. In this manner, the player 120 can determine whether the disc 70 has been inserted correctly, or not. In this embodiment, preferably, whenever a disc 70 is inserted into the player 120, the player automatically starts rotating it in a predetermined direction, for example, clockwise, and one of the heads 121, 122, is positioned over area 72 to read the series of bits in area 72, the player then determining whether a rotation reversal is necessary, or not. The series of bits can be short enough so that it extends over less than a single turn around the disc 70. The data can be written in area 72 using any disc formats, a bar code, BCA type coding, etc. While rotation reversal has been discussed specifically in relation to the double laser head player 120, it should be understood that it may be implemented with the single head player as well.

In another embodiment, once a disc is inserted, the motor rotates it in a predetermined disc, the laser head is moved to a predetermined location on the disc (for example, to the lead-in area) and the tracking error of the laser head is monitored (for example, by the spin sensor) as the disc is rotated with respect to the laser head. If this error becomes excessive, it is assumed that the disc is rotated in the wrong way and its direction of rotation is reversed.

The various means of determining the proper direction of rotation of a disc have been described in conjunction with player 120 may also be used for the same purpose in player 100. Thus, the player 100 can be operated in the same modes of operation as player 120.

While it is believed that spinning a disc in a single direction no matter which side is read is advantageous for several reasons (including minimizing dead time), other types of operation may also be implemented with the players described in which the direction of rotation is reversed as the reading process is switched from one side to the other. More specifically, the player 120 can be programmed so that it reads side A of an existing disc (such as a DVD-18) first, using laser head 122 and spinning the disc in a first direction. After this side A is read, the player 120 can reverse the direction of rotation of the disc and then start reading side B with head 121. Similarly, player 100 can be programmed so that head 102 reads side A first (both layers), and then, while the head 120 is rotated to position 102A, the motor 103 is reversed. When the laser head reaches the position 102A, it can now read side B.

One advantage of player 120 is that it has the ability to read data from both sides, simultaneously. This can be used to provide new functions and modes of operation that were either impossible or impractical with previous players.

The content recorded on optical discs is normally fairly complex and may have several components. Presently, all these components are mixed together, encoded and then recorded on the disc. However, since player 120 can read both sides of a disc simultaneously, in many instances it may be advantageous to record some of the components of a program on one side, and other components of the other side. The following table provides some examples:

|                            | SIDE A                                              | SIDE B                                                         |
|----------------------------|-----------------------------------------------------|----------------------------------------------------------------|
| HDTV OR 3D PROGRAM         | STANDARD PROGRAM                                    | SUPPLEMENTAL DATA                                              |
| MULTI-LANGUAGE PROGRAM     | VIDEO COMPONENT                                     | AUDIO COMPONENT- INCLUDING DIALOG IN ONE OR MORE LANGUAGES     |
| MULTI-LANGUAGE PROGRAM     | VIDEO COMPONENT + NON-VERBAL AUDIO (SPECIAL EFFECTS) | DIALOG IN ONE OR MORE LANGUAGES, SUBTITLES                     |
| MULTICHANNEL AUDIO         | STEREO AUDIO                                        | ADDITIONAL DATA                                                |
| AUDIO (KARAOKE)            | INSTRUMENTAL                                        | SUBTITLES                                                      |
| EDUCATIONAL MATERIALS      | QUESTIONS                                           | ANSWERS WITH DETAILED EXPLANATIONS                             |

In all of these configurations, side A contains certain key components of a disc presentation, which may even be playable on their own. For example, as indicated above, side A may have a program in a standard definition format, or may be an audio program in stereo. Side B may then contain some additional information that can selectively improve the quality of the presentation, if so desired. For example, side B may have supplemental data that, when combined with a standard definition program from side A, results in a high definition (HDTV) program, or a 3D program. An important advantage of this arrangement is that the data capacity of side A remains unchanged independently of what information is disposed on side B. Some prior art discs have been proposed in which the standard program is on one layer and the supplemental data is on the other. Of course, the supplemental data on side A reduces the amount of space left on side A for the standard program.

Alternatively, a stereo audio program can be selectively converted into a corresponding six-channel or other multichannel surround type audio program by storing the standard program on side A, and the supplemental data required to convert the standard program into a multi-channel or even multi-media program on side B. For this latter purpose, a table of contents must be provided to synchronize segments from side A with segments from side B. Alternatively, each segment from side A may include information identifying one or more segments from side B that must be read at least approximately at the same time with the segment from side A.

Alternatively, a content provider can produce several versions of a multi-media presentation having the visual portions on one side and the audio portions on the other side of optical discs. In one embodiment, the first sides of the discs are identical and are dedicated to the visual portion of the presentation. The second sides are all different and are dedicated to the audio portion, in one or several languages. Alternatively, the first sides may have the video portion and audio content exclusive of the dialog but including music and/or special effects. The second sides may be used for the dialog in different languages. For example, a movie studio may release a movie on optical discs for several geographic regions. One type of optical disc may be slated for English speaking customers only. This disc has the visual portion of the movie on side A and the audio portion in English on side B. A second type of disc may be slated for the whole North America. Again, the first side of this type of disc may carry only the visual portion of the movie (or the visual portion and the non-dialog sound portion) and the second side may be used for dialogs in Spanish, English and French. The user can select the language in which he wants to hear this dialog. The first sides of the two types of discs are identical but the second sides are different. A third type of disc may be released in Europe with the dialog in ten different languages. The first side of this type of disc is used for the visual program using an appropriate European standard. The second side includes the dialog in ten different languages. Again, the user may select which language he wants to hear.

A double-sided disc may also be used to distribute a teaching program with all the questions and related materials being disposed on side A and the answers and additional materials, such as explanations, source materials, cross-references to other materials being disposed on side B. For this implementation, the students and the teachers may be provided with two different types of players. The players for the students can read only side A, or can read side A all the time, but the data on side B can be encrypted so they become available only when the teachers provide a decryption key. The player for the teacher can be adapted to read all the data. A similar arrangement can be made for games.

It might be thought that, since the two laser heads can move independently across the respective sides, the location of the data on one side may be selected to be completely independent of the data on the other side. However, in practice—at least for a disc—this is not the case because the rotational speed of the disc is not constant, but, instead, is changed depending on the respective positions of the heads. A disc is rotated at a number of different discrete speeds. FIG. 7 shows partitioning of a disc into four zones on each side, A1, A2, A3 and A4, and B1, B2, B3 and B4, corresponding to speeds S1, S2, S3 and S4.

If equal bit rates are desired, the data on the two sides of the disc are arranged so that the data read at the same time from two sides are stored in the same zones. FIG. 8 illustrates a situation where there is less data on side B then on side A. In order to insure that the data are read at the same rate, some portion E of each zone B1, B2, B3, B4 is left empty, to insure that synchronicity is maintained between the related segments on the two sides.

In FIG. 9, a disc is shown which carries a program with the dialog being available in four languages K, L, M and N. The dialog in each language is partitioned into corresponding portions K1, K2, K3, K4, L1, L2, L3, L4, etc., and each portion is recorded in one of the respective zones B1, B2, B3, B4. Each dialog portion, e.g., K1, corresponds to a video portion recorded in zone A1.

If it is impossible to maintain synchronicity for some of the data on one side, for example, side B, then a buffer (such as buffer 132 in FIG. 3) must be provided to store the data as required. Of course, synchronicity may not be a requirement for all types of content or data. For example, synchronism is not crucial for closed caption data or subtitles since this information can be made available at a much lower output rate and can be easily buffered.

In another embodiment of the invention shown in FIG. 10, data from one side are interleaved with data from the other side. In other words, if a program consists of data segments D1, D2, D3, D4, D5, D6, D7 . . . , where each segment may be one but preferably several bytes long, then all the odd segments can be stored in sequence on side A and all the even segments can be stored on side B. The advantage of this arrangement is that as the segments are read in an alternating fashion from each side and then reassembled (either in buffer 132 in FIG. 3 or in a different buffer), the net rate at which the player can read data is considerably faster than if the segments are stored in a normal sequence.

Figure 11:
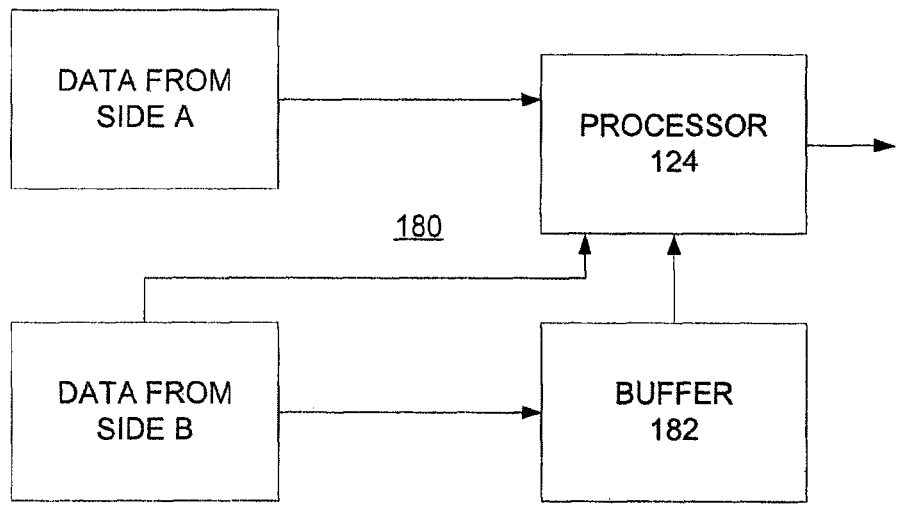
FIG. 11 shows a block diagram of a circuit for combining the data from the two sides of an optical disc.

As shown in FIG. 11, data from both sides of the disc are fed to the microprocessor 124 simultaneously. Therefore, if the player requires data to be delivered form both sides at the same time, data could be read only from two corresponding zones on sides A and B. Therefore, ideally, data on side B that are associated with the data in zone A1 should be stored in zone B1, data on side B associated with data in zone A2 should be stored in zone B2, etc.

Figure 12:
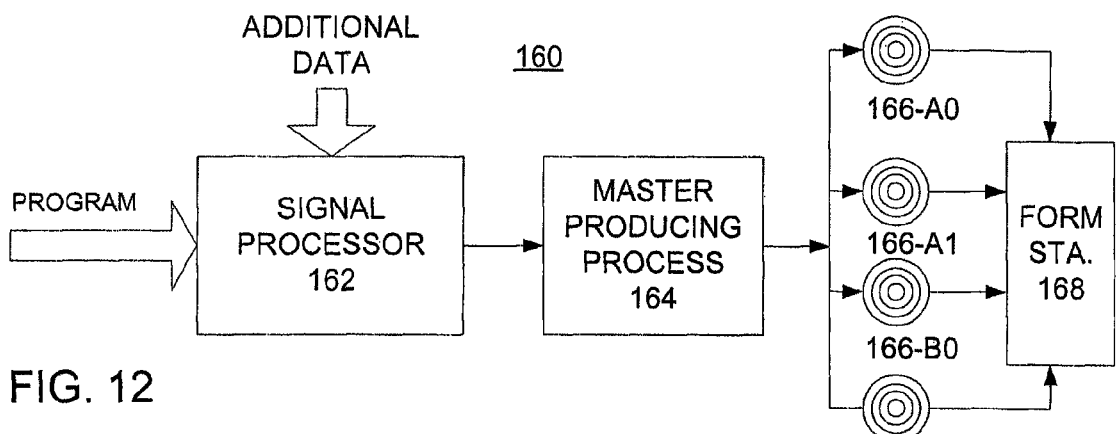
FIG. 12 shows a block diagram of an assembly used to record master discs as part of a process for mass producing optical discs in accordance with this invention.

FIG. 12 shows a block diagram for a mastering system that can be used for making discs in accordance with this invention. As shown in the drawing, data corresponding, for example, to a video program is fed to a signal processor 162. Additional data are provided to the processor by the producer describing the type of DVD that is to be produced and various other information. The signal processor 162 then generates data to be stored on the two sides of a disc and provides it to a master producing process 164. As part of this data, synchronicity information may be provided relating data segments on the two sides, as discussed above. The master producing process 164 then generates four master discs 166-A0, 166-A1, 166-B0 and 166-B1. These discs define the land and pit areas of the four data layers A0, A1, B0, B1, discussed above. The pits and lands are arranged along a first spiral on master discs 166-A0, 166-A1 and another spiral on master discs B0, B1. In prior art methods and systems, these two spirals were identical. In the present invention the two spirals are oriented in opposite directions, or are mirror images of each other. The lead-in areas and special zones discussed above and illustrated in FIGS. 5 and 6 are also formed on the respective master discs.

The four master discs are then used in a standard processing technique to mass produce a four-layer DVD disc having one of the structures shown in FIGS. 1E-1J. One such technique is described in U.S. Pat. No. 6,117,284 and incorporated herein by reference.

The DVD discs produced by the method described above are program discs that have a main section on which data is stored for a program, a lead-in area, an intermediate area and a lead-out area. Alternatively, the DVD discs could be blank discs on which data can be written at a later time. However, the discs still include the lead-in, intermediate, and lead-out areas described above. Information identifying the discs, including disc characteristics and/or the manner in which the discs are to be played, is provided on the discs, either in the lead-in area or on some other portion of the discs. This information could include an identification of the sequence in which data is to be written unto and read from the discs.

Figure 13A:
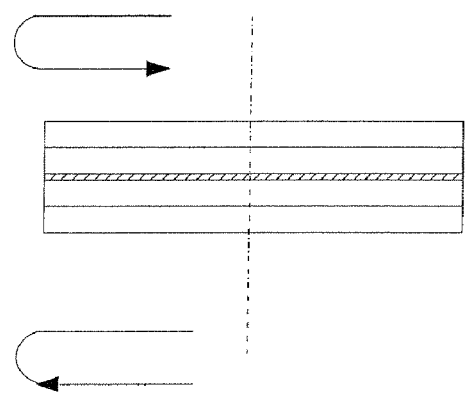
FIGS. 13A and 13B show two sequences that can be used to write data on a DVD using the DVD writer of FIG. 13.
Figure 13B:
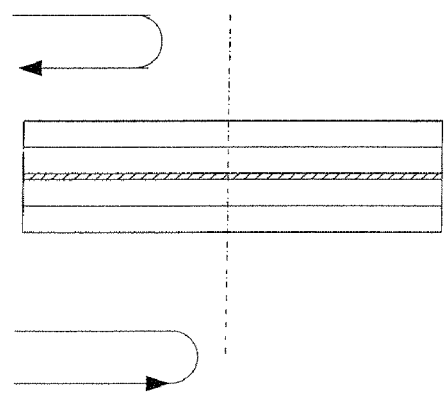
Figure 13:
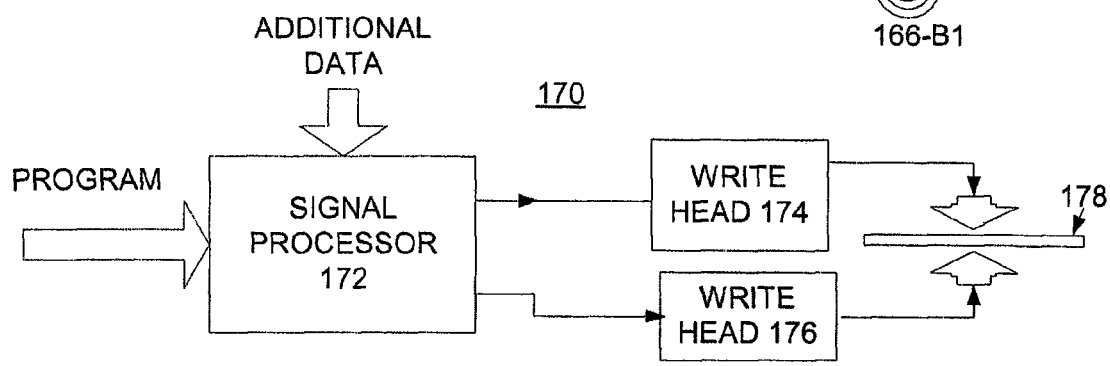
FIG. 13 shows a block diagram of a DVD writer with two heads for recording data on both sides of a DVD simultaneously.

The improved DVD discs may also be produced by using a DVD writer 170 as shown in FIG. 13. In this drawing, the program and additional data are provided to a microprocessor or controller 172. The microprocessor determines what information is to be recorded on the two sides of a disc, and provides the corresponding data to disc writing heads 174, 176. The two heads then write the data on a double-sided blank DVD disc 178, produced for example, as discussed above. The two heads can write or burn the two sides of the disc sequentially but, preferably, data are written on both sides simultaneously. The microprocessor 172 controls the movement of the heads 174, 176, as well as the rotation of the disc 178, and the radial position of the two heads. The rotation of the disc and the rates at which data are written on the respective disc sides are dependent on the radial position of the data. The microprocessor synchronizes the movements of the two heads so that the two heads are positioned radially at locations that allow them to write data as the disc 178 is being rotated at a particular rate. If necessary, for example, if for some reason the writing of data is delayed for one side, the corresponding data on the other side must be delayed as well. The sequence in which data are written is identical to the sequence in which it is expected to be read. One such writing sequence is shown in FIG. 13A and it corresponds to the reading sequence of FIG. 3A. FIG. 13B shows another possible writing sequence.

It should be understood that the DVD writer 170 can also be used to create DVD discs having the sequences of FIGS. 1E-1H. Moreover, the DVD writer 170 could also be used for writing standard DVD discs, i.e., discs that require the sides to be rotated in different directions. For this purpose, one of the heads, for example, write head 174, is used to write data on side A, while the DVD disc 178 is rotated in one direction. Then, the rotation of the disc 178 is reversed, and the write head 176 is used to write data on the other side of the disc.

The components of DVD writer 170 are similar to the components of the DVD player 120 in FIG. 3, and the DVD writer 170 could be used as a player as well, operating in the same manner as player 120. The only significant differences between the two devices are that in the DVD writer 170 heads can also be used not only to read data from the DVD, but also to write data on the data layers of the respective disc. In addition, the microprocessor 172 not only processes the data from a DVD but also receives data from other sources, and uses the same to generate data streams, one for each of the write heads 174, 176. In addition, while organizing the data for the DVD, the microprocessor 172 also processes the external data to insure that if any data segment written on one side is related to, and has to be read in conjunction with data from the other side, as discussed above, then data on the two sides should be written on the same radial region of the disc to avoid excessive buffering requirements for both writing and reading.

In some situations, it may be advantageous to read portions of data first from one layer and then another, in an alternating manner. One scheme that allows a player to perform this type of operation involves rotating the disc at a high speed, for example twice the normal speed, reading data alternately first from one layer and then the other and then combining the data this read. The periods of time during which data is read continuously from one layer can be made a variable or a fixed period. For example, data from each layer may be read for a preset period. Alternatively, data from one layer may be read and stored in a first memory. When the memory is full, data reading can be switched to a second layer and the reading of the second reading could be continued until either the first memory can accept data again, until a second memory receiving data from the second data layer is full, and/or some other criteria. While this technique is preferred, other techniques may be used as well, as discussed below.

In the players discussed above and shown in the drawings, as well as in conventional players, a laser head is arranged to read one layer at a time, and must be refocused before it can read another layer. Some players are provided with laser heads that have two lasers, one being used to read data and the second being used for tracking and focusing, as disclosed, for instance, in U.S. Pat. No. 6,576,319, incorporated herein by reference.

Figure 14:
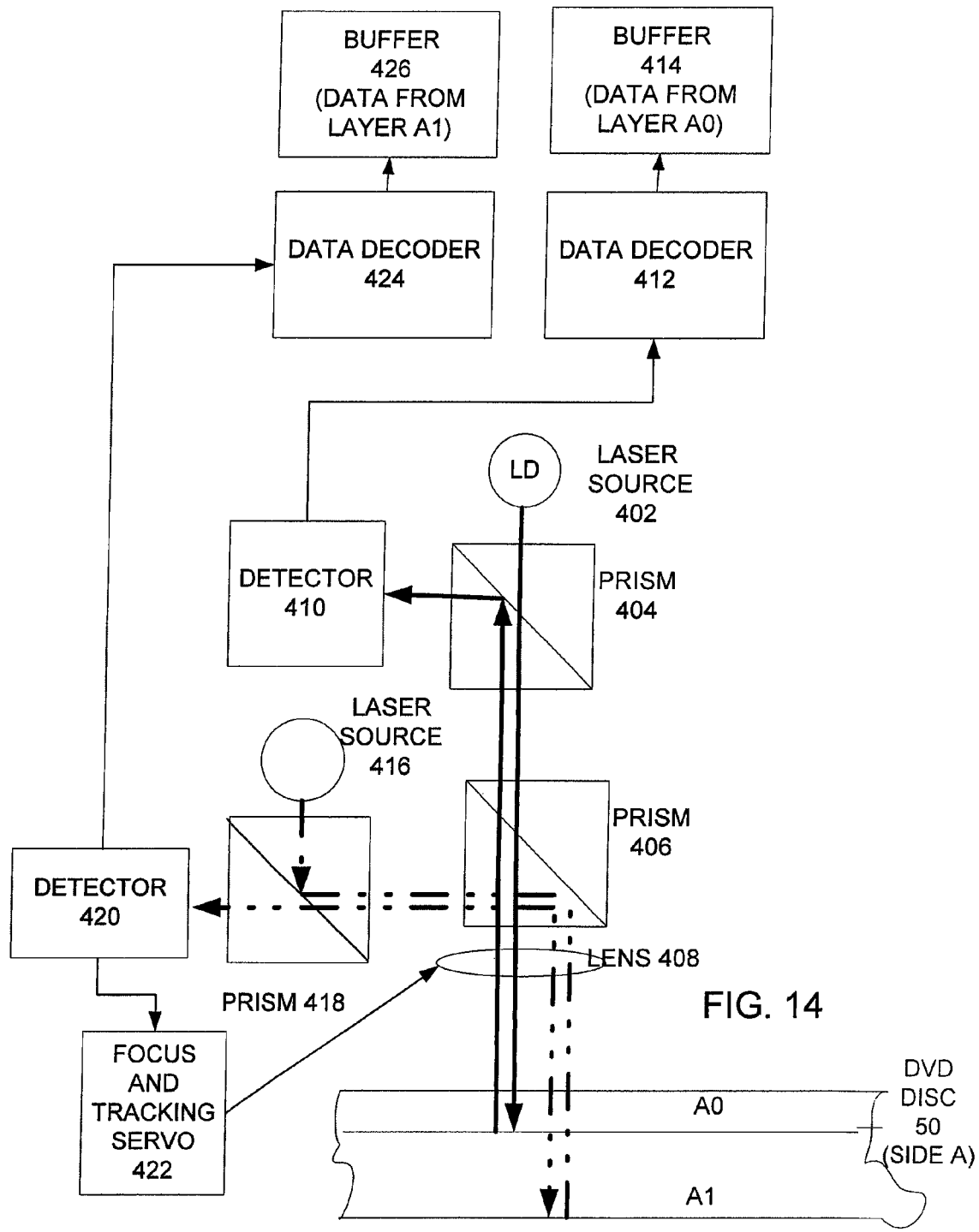
FIG. 14 shows a block diagram for a laser head in a DVD player that can read two layers on the same side of a disc at the same time.

In the present invention, data may be read from two data layers of a disc as follows. A head 400 with this capability is shown in FIG. 14. In this Figure only side A of the disc 50 is shown with two data layers A0 and A1. The head 400 includes a first laser 402, dichroic prisms 404, 406 and 418 and a focusing lens 408. It should be understood that other lenses and optical elements may be used, however, they are omitted for the sake of clarity. The incident beam from laser 402 passes through the dichroic prisms 404, 406 and lens 408. The beam is then reflected by the data layer A0 and passes back through dichroic prism 406 to prism 404. The dichroic prism 404 reflects the reflective beam to a detector 410. The detector 410 analyzes the reflected beam to detect the data on layer A0. This data is then decoded by data decoder 412 and is stored in a buffer 414. A second incident beam from a second laser source 416, is reflected by dichroic prisms 418 and 406, and is focused by lens 408 onto layer A1. The corresponding reflected beam from this layer passes back through the lens 408 and prisms 406, 418 to detector 420. The detector 420 analyzes the data of the reflected beam from data layer A0 and provides corresponding information to a focus and tracking servo 422 that is used to control the lens 408 in the normal fashion. In addition, the data from layer A0 is sent to data decoder 424 which decodes the data and stores it in a buffer 424. In this manner the head 400 reads data from the disc 50. The data from layer A0 is stored in buffer 414 and then processed further together with the data from layer A1 stored in buffer 426.

The two laser sources 402, 416 could be identical, or one could be replaced by a single laser source and a beam splitter that splits the beam from the source into two components. However, in either case, there may be too much cross-talk between the two received beams for the detectors 410, 420 to be able to detect the two signals reliably. Therefore, preferably, the laser sources generate light beams of different frequencies, thereby avoiding cross-talk. In this manner, the data from the two layers can be read simultaneously.

Alternatively, the two laser beams can be activated sequentially and the data can be read on the same track, first from one layer, then from the other, before the laser head is moved to the next track.

The head 400 could be used to read data from a single- or a double-sided optical disc.

The discs and players have been primarily described as being used to read data associated with a multimedia audio or audio-visual program. However, they may also be used as memory devices for storing and reading data files, including text files. For example, the discs may contain the text and graphic files for encyclopedias.

While the invention has been described with reference to several particular embodiments, it is to be understood that these embodiments are merely illustrative of the principles of the invention. Accordingly, the embodiments described in particular should be considered as exemplary, not limiting, with respect to the following claims.

We claim:

1. An optical disc for storing content, said optical disc comprising:
    a first side with at least one data layer for storing a first content type; and
    a second side with at least one data layer for storing supplemental content associated with said first content type;
    wherein said first content type and said supplemental content include audio and video components, wherein said video components are stored on said first side and said audio components are disposed on said second side of said optical disc; and
    wherein said audio components includes additional information, said additional information being appended to said audio components to have an equal bit rate with said video component, said equal bit rate providing synchronicity between said first and second sides when said optical disc is being read by a player.

2. The optical disc of claim 1, wherein said audio components include a plurality of audio signals in different languages.

3. The optical disc of claim 1, wherein said components are arranged on said optical disc so that as an optical disc player reads said optical disc, corresponding portions of said video and audio components are read simultaneously.

4. The optical disc of claim 3, wherein each of said first and second sides are partitioned into first and second zones, wherein data in said first and second zones is stored at first and second data rates, respectively.

5. The optical disc of claim 1, wherein said additional information includes empty bits.

6. The optical disc of claim 1, wherein said additional information includes a plurality of subtitles in different languages.

7. An optical disc for storing content, said optical disc comprising:
    a first side with at least one data layer for storing a first content type; and
    a second side with at least one data layer for storing supplemental content associated with said first content type, wherein said first content type includes a program at a standard definition on one side and said supplemental content includes additional information on the second side, said additional information rendering the program in standard definition into a corresponding program at a high definition.

8. The optical disc of claim 7, wherein said additional information selectively enhances quality and presentation of said standard definition programs when a player reads said standard definition programs and said additional information simultaneously.

9. The optical disc of claim 7, wherein said additional information and said standard definition program are read by said player simultaneously to produce at least one of a High Definition Television (HDTV) program and a 3D program.

10. The optical disc of claim 7, wherein said additional information associated with said standard definition program is read by said player simultaneously to produce a multi-channel surround sound audio program.

* * * * *